United States Patent
Imfeld et al.

(10) Patent No.: US 11,009,232 B2
(45) Date of Patent: May 18, 2021

(54) COMBUSTOR DEVICE FOR A GAS TURBINE ENGINE AND GAS TURBINE ENGINE INCORPORATING SAID COMBUSTOR DEVICE

(71) Applicant: ANSALDO ENERGIA SWITZERLAND AG, Baden (CH)

(72) Inventors: Jost Imfeld, Scherz (CH); Paul Marlow, Baden (CH); Oliver Konradt, Waldshut-Tiengen (DE); Urs Benz, Gipf-Oberfrick (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 242 days.

(21) Appl. No.: 15/695,510

(22) Filed: Sep. 5, 2017

(65) Prior Publication Data

US 2018/0066848 A1    Mar. 8, 2018

(30) Foreign Application Priority Data

Sep. 5, 2016   (EP) ..................................... 16187167

(51) Int. Cl.
| | |
|---|---|
| *F23R 3/00* | (2006.01) |
| *F23R 3/60* | (2006.01) |
| *F23R 3/50* | (2006.01) |
| *F23R 3/42* | (2006.01) |
| *F01D 25/26* | (2006.01) |
| *F01D 25/28* | (2006.01) |
| *F02C 3/14* | (2006.01) |

(52) U.S. Cl.
CPC ................ *F23R 3/60* (2013.01); *F01D 25/26* (2013.01); *F01D 25/28* (2013.01); *F23R 3/002* (2013.01);

(Continued)

(58) Field of Classification Search
CPC ...... F23R 3/60; F23R 3/42; F23R 3/50; F23R 2900/00017; F23R 2900/00019;

(Continued)

(56) References Cited

U.S. PATENT DOCUMENTS 2,510,645 A * 6/1950 McMahan ................. F23R 3/04
60/796
5,233,822 A * 8/1993 Ward .................... F01D 25/285
60/39.37

(Continued)

FOREIGN PATENT DOCUMENTS

| | | |
|---|---|---|
| EP | 0 497 519 A1 | 8/1992 |
| GB | 2 247 521 A | 3/1992 |

(Continued)

OTHER PUBLICATIONS

Extended European Search Report dated Mar. 23, 2017, by the European Patent Office for corresponding European Application No. 16187167.8 (8 pages).

*Primary Examiner* — Todd E Manahan
*Assistant Examiner* — Edwin Kang
(74) *Attorney, Agent, or Firm* — Buchanan Ingersoll & Rooney PC

(57) ABSTRACT

Combustor device having a twin-shell tubular casing including: an inner tubular member which extends roughly coaxial a longitudinal axis of the combustor device, delimits the combustion chamber and surrounds the burner; and an outer tubular housing which extends roughly coaxial outside of the inner tubular member. An intermediate supporting structure includes an outer annular supporting member, an inner annular supporting member, and a series of three or more oblong connecting beams angularly staggered about the longitudinal axis of combustor device in cantilever manner to stably connect the inner and outer annular supporting members.

12 Claims, 4 Drawing Sheets

(52) U.S. Cl.
CPC .................. *F23R 3/42* (2013.01); *F23R 3/50* (2013.01); *F02C 3/14* (2013.01); *F23R 2900/00017* (2013.01); *F23R 2900/00019* (2013.01)

(58) Field of Classification Search
CPC ........ F01D 25/26; F01D 25/28; F01D 25/243; F02C 3/14; F02C 7/32; F02C 7/20; F05D 2240/91; F05D 2260/30
See application file for complete search history.

(56) References Cited

U.S. PATENT DOCUMENTS

| | | | |
|---|---|---|---|
| 2002/0184889 A1* | 12/2002 | Calvez | F23R 3/007 60/796 |
| 2006/0010879 A1* | 1/2006 | Aumont | F01D 9/023 60/796 |
| 2006/0032236 A1* | 2/2006 | Aumont | F01D 9/023 60/796 |
| 2009/0317175 A1* | 12/2009 | Martinez | F02K 1/80 403/24 |
| 2011/0067402 A1 | 3/2011 | Wiebe et al. | |
| 2015/0068212 A1 | 3/2015 | Ginesin et al. | |
| 2017/0307221 A1* | 10/2017 | Hucker | F23R 3/46 |

FOREIGN PATENT DOCUMENTS

| | | |
|---|---|---|
| GB | 201607016 A2 * | 6/2016 |
| WO | WO 2013/157976 A1 | 10/2013 |

* cited by examiner

COMBUSTOR DEVICE FOR A GAS TURBINE ENGINE AND GAS TURBINE ENGINE INCORPORATING SAID COMBUSTOR DEVICE

PRIORITY CLAIM

This application claims priority from European Patent Application No. 16187167.8 filed on Sep. 5, 2016, the disclosure of which is incorporated by reference.

TECHNICAL FIELD

The present invention relates to a combustor device for a gas turbine engine and to a gas turbine engine incorporating said combustor device.

More specifically, the present invention preferably relates to a combustor device for a gas turbine engine with sequential combustion. Use to which the following description will make explicit reference purely by way of example and without implying any loss of generality.

BACKGROUND

As is known, a gas turbine engine with sequential combustion is traditionally provided with two combustor assemblies arranged one downstream the other.

The first combustor assembly receives a flow of compressed air from a multi-stage compressor located upstream of both combustor assemblies. The flow of hot gasses generated by the first combustor assembly is channeled into the second combustor assembly. The flow of high-pressure and high-temperature hot gases leaving the second combustor assembly, in turn, is channeled to a multi-stage expansion turbine located downstream of both combustor assemblies.

Optionally an intermediate expansion turbine is moreover interposed between the two combustor assemblies for subjecting the flow of hot gasses moving from first to second combustor assembly to a partial expansion that reduces the temperature of the hot gasses directed to the second combustor assembly.

Usually each combustor assembly basically consists of a number of oblong combustor devices which are angularly staggered around the engine shaft of the gas turbine engine, usually so that each combustor device of the first combustor assembly is aligned to a respective combustor device of the second combustor assembly.

Generally each combustor device comprises: a tubular casing that delimits an oblong combustion chamber wherein combustion of the inflammable mixture occurs; and a burner which is located inside the tubular casing, upstream of the combustion chamber, and is adapted to mix the fuel to the compressed air arriving from the multi-stage compressor of the gas turbine engine or the diluted hot gasses arriving from the first combustor assembly in both cases for producing said inflammable mixture.

To support both thermal and mechanical stresses, the tubular casing of each combustor device usually has a twin-shell structure which is cooled by a combination of external convection and internal film convection.

More specifically, the tubular casing of the combustor device includes: a tubular inner liner accommodating the burner and delimiting the combustion chamber, and a tubular housing that encloses the tubular inner liner slightly spaced from the same inner liner so as to form an annular interspace which receives the compressed air from the multi-stage compressor of the gas turbine engine.

Nowadays the tubular inner liner is rigidly fixed to the outer housing via a number interlock radial keys.

Unfortunately during operation of the gas turbine engine, the tubular inner liner is used to move axially and expand radially inside the outer housing due to different coefficients of thermal expansion and to momentarily different thermal conditions. In the long term, these movements tend to wear the radial keys with all problems that this entails.

DISCLOSURE OF THE INVENTION

Aim of the present invention is to avoid the drawbacks correlated to the use of radial keys.

In compliance with these aims, according to the present invention there is provided a combustor device for a gas turbines engine comprising: a tubular casing which delimits an oblong combustion chamber wherein combustion of an inflammable mixture occurs; and a burner which is located inside the tubular casing, upstream of said combustion chamber, and forms said inflammable mixture;

said tubular casing, in turn, comprising: an inner tubular member which extends roughly coaxial a longitudinal axis of the combustor device, delimits the combustion chamber and surrounds the burner; an outer tubular housing which extends roughly coaxial to the inner tubular member, outside of the same inner tubular member, and is dimensioned to enclose the inner tubular member spaced apart from the latter; and an intermediate supporting structure which is interposed between the inner tubular member and the outer tubular housing for firmly connecting and stably maintaining the inner tubular member roughly coaxial to the outer tubular housing;

said combustor device being characterized in that said intermediate supporting structure comprises: an outer annular supporting member associated the outer tubular housing; an inner annular supporting member associated to the inner tubular member; and a series of three or more oblong connecting beams which jut out from a first annular supporting member among said inner and outer annular supporting members angularly staggered about the longitudinal axis of combustor device, and separately extend in cantilever manner to the a second annular supporting member among said inner and outer annular supporting members in a non-radial direction to stably connect said inner and outer annular supporting members to one another.

Preferably, though not necessarily, the combustor device is furthermore characterized in that each oblong connecting beam rigidly protrudes from said first annular supporting member, and separately extend in cantilever manner and in said non-radial direction towards said second annular supporting member; the distal ends of said oblong connecting beams being stably connected to said second annular supporting member.

Preferably, though not necessarily, the combustor device is furthermore characterized in that each oblong connecting beam is structured to have a flexible behavior in radial direction, so that the distal end of the same connecting beam is allowed to freely make movements in radial direction.

Preferably, though not necessarily, the combustor device is furthermore characterized in that the distal end of each oblong connecting beam is hinged to said second annular supporting member.

Preferably, though not necessarily, the combustor device is furthermore characterized in that the distal end of each oblong connecting beam is rigidly connected to said second annular supporting member by bolting or welding or brazing.

Preferably, though not necessarily, the combustor device is furthermore characterized in that said second annular supporting member is provided with a number of protruding lugs that jut out from the same second annular supporting member angularly staggered about the longitudinal axis of combustor device, and in that the distal end of each oblong connecting beam is stably connected to a respective protruding lug of said second annular supporting member.

Preferably, though not necessarily, the combustor device is furthermore characterized in that the distal ends of the oblong connecting beams are stably connected to said second annular supporting member at respective fixing points angularly staggered about the longitudinal axis of combustor device.

Preferably, though not necessarily, the combustor device is furthermore characterized in that the fixing points of said oblong connecting beams onto said second annular supporting member are axially and/or angularly misaligned to the fixing points of the same oblong connecting beams onto said first annular supporting member.

Preferably, though not necessarily, the combustor device is furthermore characterized in that said oblong connecting beams are roughly evenly angularly staggered about the longitudinal axis of combustor device.

Preferably, though not necessarily, the combustor device is furthermore characterized in that said inner and said outer annular supporting members are axially shifted to one another.

Preferably, though not necessarily, the combustor device is furthermore characterized in that said each oblong connecting beam is arranged coplanar to a radially-extending reference laying plane.

Preferably, though not necessarily, the combustor device is furthermore characterized in that each oblong connecting beam is substantially L-shaped so that a proximal segment of the connecting beam extends from said first annular supporting member in a roughly radial direction, and an adjoined distal segment of the connecting beam extends towards the second annular supporting member in a non-radial direction sloped with respect to the longitudinal axis of combustor device.

Preferably, though not necessarily, the combustor device is furthermore characterized in that said inner annular supporting member is stably rigidly fitted to or is directly incorporated into said inner tubular member.

Preferably, though not necessarily, the combustor device is furthermore characterized in that said outer annular supporting member is stably rigidly fixed to or is directly incorporated into said outer tubular housing.

Moreover according to the present invention there is also provided a gas turbine engine comprising a compressor in which compression of the outside air occurs for producing a flow of compressed air, a combustor assembly in which combustion of a mixture of fuel and compressed air arriving from said compressor occurs for producing a flow of hot gasses, and an expansion turbine in which expansion of the hot gasses arriving from combustor assembly occurs;

said gas turbine engine being characterized in that said combustor assembly includes at least one combustor device comprising: a tubular casing which delimits an oblong combustion chamber wherein combustion of an inflammable mixture occurs; and a burner which is located inside the tubular casing, upstream of said combustion chamber, and forms said inflammable mixture;

said tubular casing comprising: an inner tubular member which extends roughly coaxial a longitudinal axis of the combustor device, delimits the combustion chamber and surrounds the burner; an outer tubular housing which extends roughly coaxial to the inner tubular member, outside of the same inner tubular member, and is dimensioned to enclose the inner tubular member spaced apart from the latter; and an intermediate supporting structure which is interposed between the inner tubular member and the outer tubular housing for firmly connecting and stably maintaining the inner tubular member roughly coaxial to the outer tubular housing;

said intermediate supporting structure comprising: an outer annular supporting member associated the outer tubular housing; an inner annular supporting member associated to the inner tubular member; and a series of three or more oblong connecting beams which jut out from a first annular supporting member among said inner and outer annular supporting members angularly staggered about the longitudinal axis of combustor device, and separately extend in cantilever manner to the a second annular supporting member among said inner and outer annular supporting members in a non-radial direction to stably connect said inner and outer annular supporting members to one another.

Preferably, though not necessarily, the gas turbine engine is furthermore characterized in that each oblong connecting beam of said intermediate supporting structure rigidly protrudes from said first annular supporting member, and separately extend in cantilever manner and in said non-radial direction towards said second annular supporting member; the distal ends of said oblong connecting beams being stably connected to said second annular supporting member.

Preferably, though not necessarily, the gas turbine engine is furthermore characterized in that each oblong connecting beam of said intermediate supporting structure is structured to have a flexible behavior in radial direction, so that the distal end of the same connecting beam is allowed to freely make movements in radial direction.

Preferably, though not necessarily, the gas turbine engine is furthermore characterized in that the distal end of each oblong connecting beam is hinged to said second annular supporting member.

Preferably, though not necessarily, the gas turbine engine is furthermore characterized in that the distal end of each oblong connecting beam is rigidly connected to said second annular supporting member by bolting or welding or brazing.

Preferably, though not necessarily, the gas turbine engine is furthermore characterized in that the second annular supporting member of said intermediate supporting structure is provided with a number of protruding lugs that jut out from the same second annular supporting member angularly staggered about the longitudinal axis of combustor device, and in that the distal end of each oblong connecting beam is stably connected to a respective protruding lug of said second annular supporting member.

Preferably, though not necessarily, the gas turbine engine is furthermore characterized in that the distal ends of the oblong connecting beams are stably connected to said second annular supporting member at respective fixing points angularly staggered about the longitudinal axis of combustor device.

Preferably, though not necessarily, the gas turbine engine is furthermore characterized in that the fixing points of the oblong connecting beams of said intermediate supporting structure onto said second annular supporting member are axially and/or angularly misaligned to the fixing points of the same oblong connecting beams onto said first annular supporting member.

Preferably, though not necessarily, the gas turbine engine is furthermore characterized in that the oblong connecting beams of said intermediate supporting structure are roughly evenly angularly staggered about the longitudinal axis of combustor device.

Preferably, though not necessarily, the gas turbine engine is furthermore characterized in that said inner and said outer annular supporting members of said intermediate supporting structure are axially shifted to one another.

Preferably, though not necessarily, the gas turbine engine is furthermore characterized in that said each oblong connecting beam of said intermediate supporting structure is arranged coplanar to a radially-extending reference laying plane.

Preferably, though not necessarily, the gas turbine engine is furthermore characterized in that each oblong connecting beam of said intermediate supporting structure is substantially L-shaped so that a proximal segment of the connecting beam extends from said first annular supporting member in a roughly radial direction, and an adjoined distal segment of the connecting beam extends towards the second annular supporting member in a non-radial direction sloped with respect to the longitudinal axis of combustor device.

Preferably, though not necessarily, the gas turbine engine is furthermore characterized in that the inner annular supporting member of said intermediate supporting structure is stably rigidly fitted to or is directly incorporated into said inner tubular member.

Preferably, though not necessarily, the gas turbine engine is furthermore characterized in that the outer annular supporting member of said intermediate supporting structure is stably rigidly fixed to or is directly incorporated into said outer tubular housing.

Preferably, though not necessarily, the gas turbine engine is furthermore characterized in that said combustor assembly comprises a number of said combustor devices angularly staggered around the engine shaft of the gas turbine engine.

Lastly according to the present invention there is also provided a gas turbine engine comprising a compressor in which compression of the outside air occurs for producing a flow of compressed air, a combustor assembly in which combustion of a mixture of fuel and compressed air arriving from said compressor occurs for producing a flow of hot gasses, and an expansion turbine in which expansion of the hot gasses arriving from combustor assembly occurs;

said gas turbine engine including: an inner tubular element; an outer tubular element extending roughly coaxial to said inner tubular element, outside of the same inner tubular element, and is dimensioned to enclose the inner tubular element spaced apart from the latter; and an intermediate supporting structure which is interposed between the inner tubular element and the outer tubular element for firmly connecting and stably maintaining the inner tubular element roughly coaxial to the outer tubular element;

said gas turbine engine being characterized in that said intermediate supporting structure comprises: an outer annular supporting member associated to the outer tubular element; an inner annular supporting member associated to the inner tubular element; and a series of three or more oblong connecting beams which jut out from a first annular supporting element among said inner and outer annular supporting elements angularly staggered about the longitudinal axis of the inner annular supporting element, and separately extend in cantilever manner to the a second annular supporting element among said inner and outer annular supporting elements in a non-radial direction to stably connect said inner and outer annular supporting members to one another.

Preferably, though not necessarily, the gas turbine engine is furthermore characterized in that each oblong connecting beam of said intermediate supporting structure rigidly protrudes from said first annular supporting element, and separately extend in cantilever manner and in said non-radial direction towards said second annular supporting element; the distal ends of said oblong connecting beams being stably connected to said second annular supporting member.

Preferably, though not necessarily, the gas turbine engine is furthermore characterized in that each oblong connecting beam of said intermediate supporting structure is structured to have a flexible behavior in radial direction, so that the distal end of the same connecting beam is allowed to freely make movements in radial direction.

Preferably, though not necessarily, the gas turbine engine is furthermore characterized in that the distal end of each oblong connecting beam is rigidly connected to said second annular supporting member by bolting, welding or brazing; and/or in that the proximal end of each oblong connecting beam is rigidly connected to said first annular supporting member by bolting, welding or brazing.

Preferably, though not necessarily, the gas turbine engine is furthermore characterized in that the first and second annular supporting elements of said intermediate supporting structure are axially shifted to one another.

BRIEF DESCRIPTION OF THE DRAWINGS

The present invention will now be described with reference to the accompanying drawings, which show a non-limitative embodiment thereof, in which:

FIG. 5 is an end view of an alternative embodiment of the combustor device shown in FIG. 3, with parts removed for clarity; whereas

DETAILED DESCRIPTION OF THE INVENTION

Figure 1:
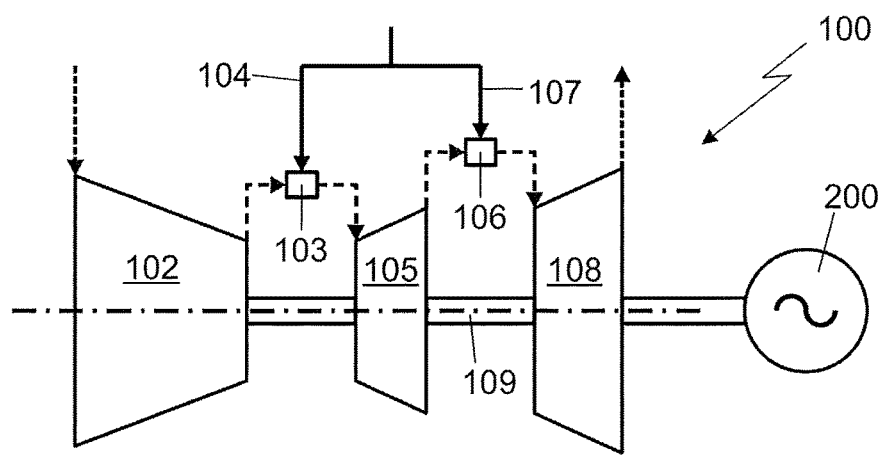
FIG. 1 is a schematic view of a gas turbine engine provided with a number of combustor devices realized according to the teachings of the present invention.
Figure 2:
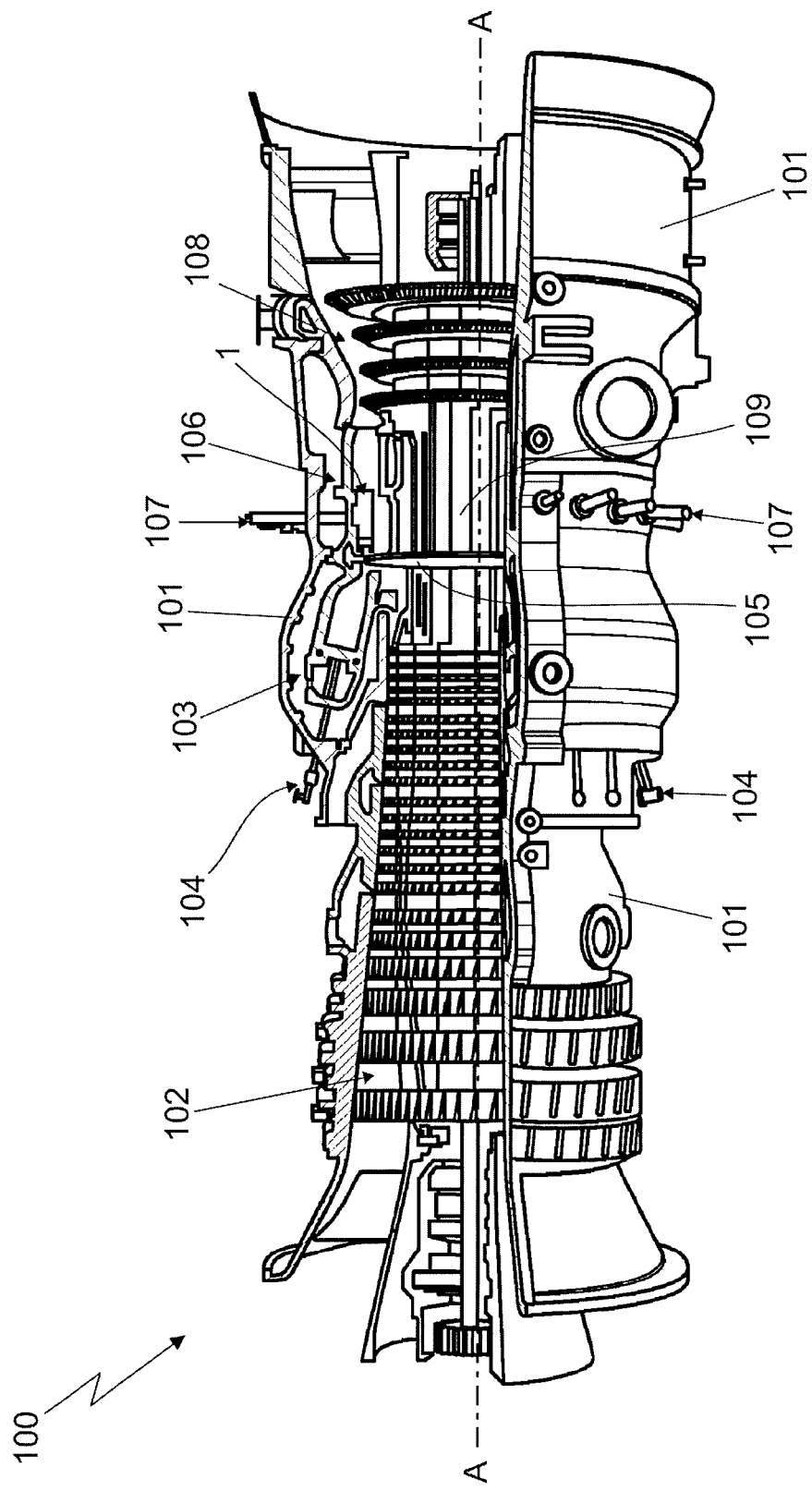
FIG. 2 is a partially sectioned, perspective view of the gas turbine engine shown in FIG. 1.

With reference to FIGS. 1 and 2, referral number 1 denotes as a whole a combustor device suitable to be incorporated into a gas turbine engine 100, preferably with sequential combustion, which in turn is particularly adapted to drive into rotation a traditional electric generator 200.

In more detail, the gas turbine engine 100 preferably basically comprises a main tubular outer casing 101 and, inside said tubular outer casing 101: a preferably multi-stage, compressor 102 in which compression of the outside air occurs for producing a flow of compressed air; a first combustor assembly 103 which is located downstream of compressor 102 and in which combustion of a mixture of compressed air arriving from compressor 102 and fuel arriving from a first fuel supply line 104 occurs for producing a flow of hot gasses; a preferably, though not necessarily, multi-stage, first expansion turbine 105 which is located downstream of combustor assembly 103 and in which a partial expansion of the hot gasses arriving from combustor assembly 103 occurs; a second combustor assembly 106 which is located downstream of the expansion turbine 105 and in which combustion of a mixture of the hot gasses arriving from combustor assembly 103 through expansion turbine 105 and fuel arriving from a second fuel supply line 107 occurs for producing a second flow of hot gasses;

and finally a preferably multi-stage, second expansion turbine 108 which is located downstream of combustor assembly 106 and in which a complete expansion of the hot gasses arriving from combustor assembly 106 occurs before said hot gasses leave the gas turbine engine 100.

First and/or second combustor assemblies 103 and 106, in turn, comprise/s at least one and preferably a number of discrete combustor devices 1 preferably evenly angularly staggered around the engine shaft 109 of gas turbine engine 100.

Overall structure of gas turbine engine 100 is widely known per se, thus no further explanations are required.

Figure 4:
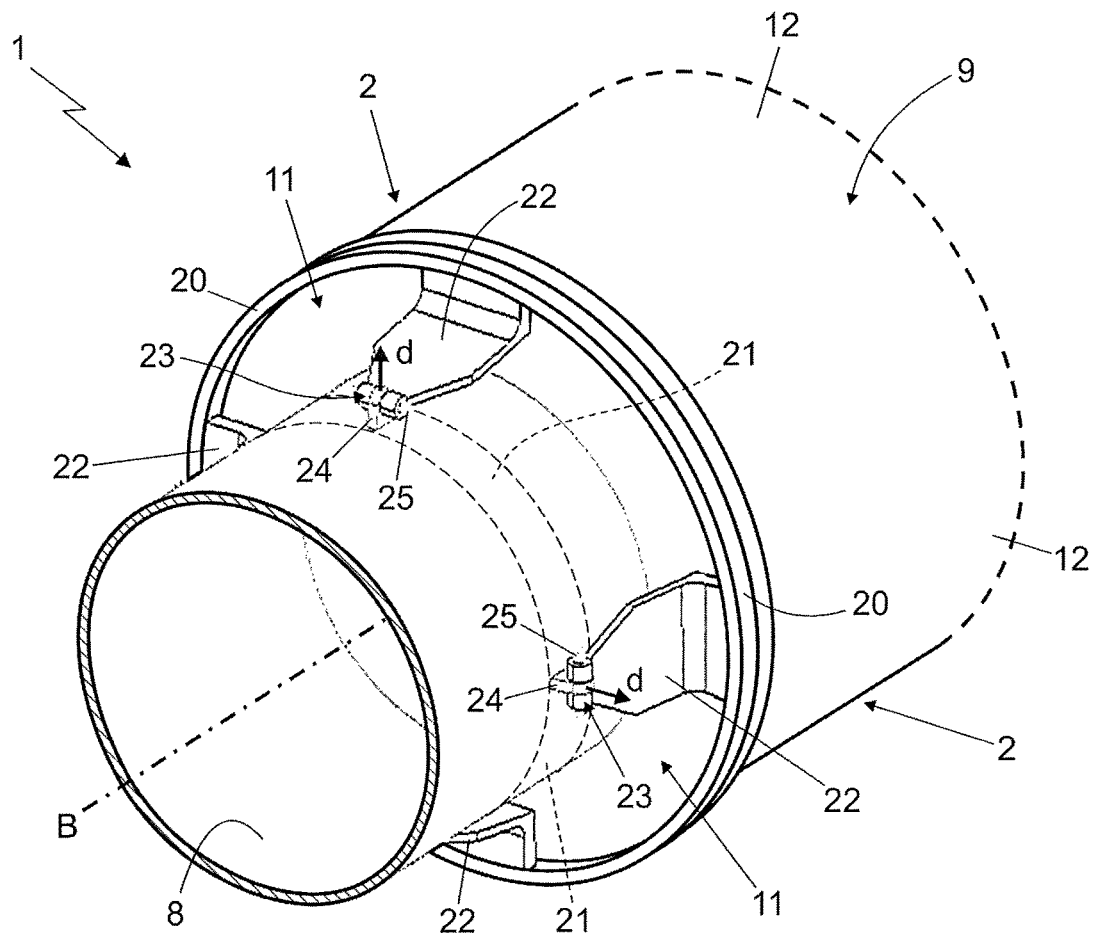
FIG. 4 is a perspective view of part of the central section of the combustor device shown in FIG. 3, with parts in section and parts removed for clarity.
Figure 3:
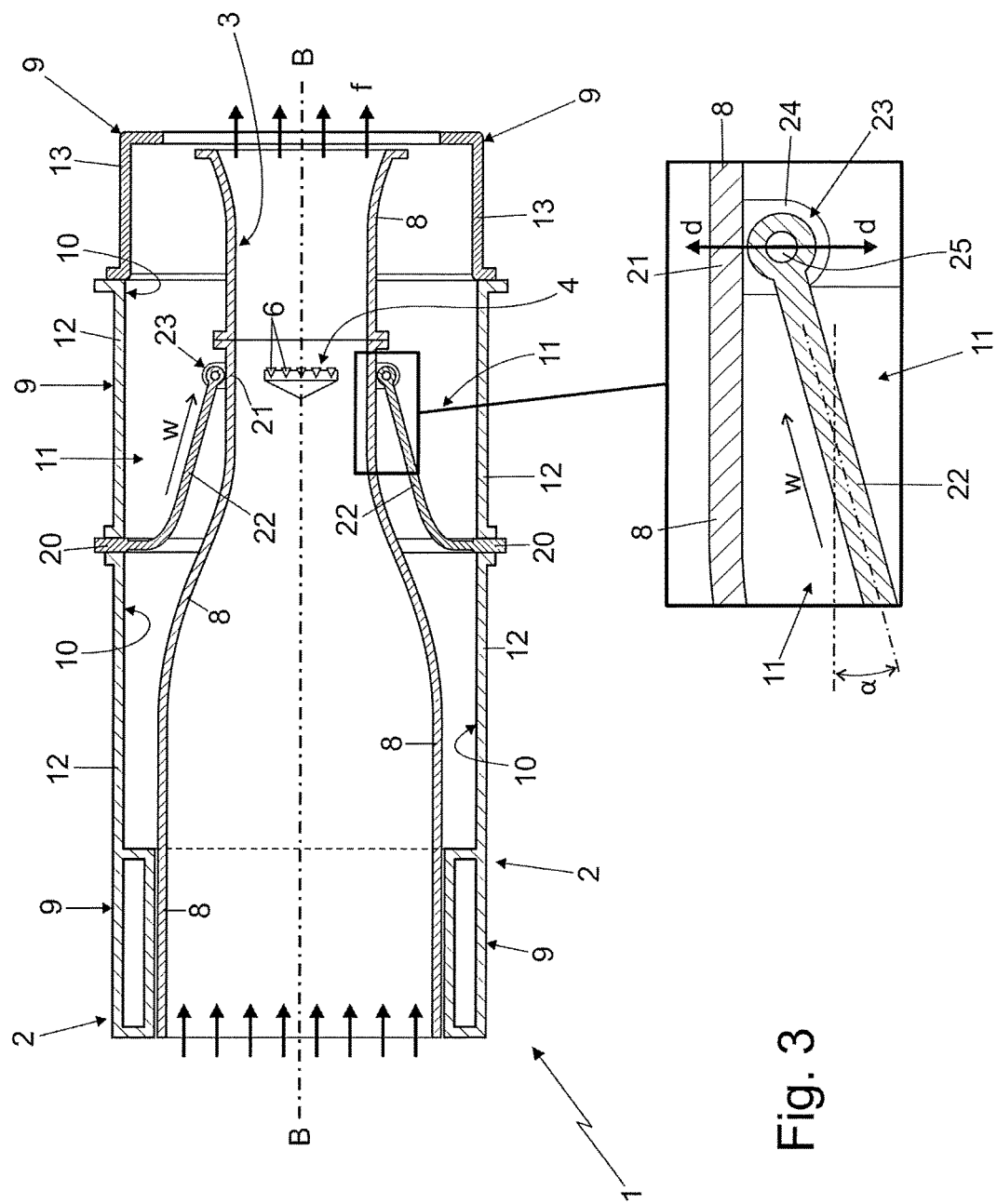
FIG. 3 is a side view of one of the combustor devices shown in FIG. 2 and realized according to the teachings of the present invention, with parts in section and parts removed for clarity.

With particular reference to FIGS. 3 and 4, each combustor device 1 preferably, though not necessarily, extends roughly parallel to the longitudinal axis A of the gas turbine engine 100, and basically comprises: a tubular casing 2 which extends coaxial to the longitudinal axis B of combustor device 1, and delimits at least a part of a combustion chamber 3 wherein combustion of the inflammable mixture occurs; and a burner 4 which is located inside the tubular casing 2, immediately upstream of combustion chamber 3, and is adapted to continuously mix a fuel to the compressed air arriving from compressor 102 (if belonging to combustor assembly 103) or to the diluted hot gasses arriving from combustor assembly 103 (if belonging to combustor assembly 103) for producing an inflammable mixture that is immediately combusted inside combustion chamber 3.

More specifically, the burner 4 is preferably arranged coaxial to the longitudinal axis B of combustor device 1, i.e. roughly at centre of the tubular casing 2, and preferably includes one or more fuel injectors 6 which receive the fuel from said first fuel supply line 105 or from said second fuel supply line 107 via a delivery pipe (not shown), and are capable of atomizing said fuel inside the tubular casing 2, so as to produce an inflammable mixture that is immediately combusted inside the adjacent combustion chamber 3 for producing a massive flow f of hot gasses that subsequently leave the tubular casing 2.

Tubular casing 2, in turn, has a twin-shell structure thus to be cooled by a combination of external convection and internal film convection.

In more detail, with reference to FIGS. 3 and 4, tubular casing 2 basically comprises: an inner tubular member 8, commonly referred to as "inner liner", that extends roughly coaxial to the longitudinal axis B of combustor device 1, surrounds burner 4 and lastly delimits the combustion chamber 3; an outer tubular housing 9 that extends roughly coaxial to tubular member 8, outside of tubular member 8, and is dimensioned to enclose the tubular member 8 while remaining slightly spaced from the latter so as to form an annular interspace or cavity 10; and an intermediate annular supporting structure 11 which is interposed between tubular member 8 and tubular housing 9 for firmly connecting and stably maintaining the inner tubular member 8 roughly coaxial to the outer tubular housing 9.

Preferably the inlet section of tubular member 8 is furthermore telescopically fitted in axially sliding manner to the inlet section of tubular housing 9.

With reference to FIG. 3, in the example shown, in particular, the inner tubular member 8 preferably has a roughly circular cross-section and preferably has a converging-diverging profile.

The burner 4 is preferably located inside a first tubular portion of tubular member 8 having the smaller cross sectional flow area. Combustion chamber 3, in turn, is preferably delimited by a second tubular portion of tubular member 8 having a greater cross sectional flow area.

Preferably first and/or second tubular portions of inner tubular member 8 are furthermore roughly cylindrical in shape.

According to an alternative embodiment, however, the inner tubular member 8 could be substantially funnel-shaped and would preferably diverge towards the inlet of tubular casing 2.

Preferably the inner tubular member 8 is moreover provided with a plenty of small pass-through effusion cooling holes (not shown) that are preferably evenly distributed on at least part of the second tubular portion of tubular member 8; and/or with a number of large pass-through dilution openings (not shown) that are suitably spaced on the second tubular portion of tubular member 8, and are each dimensioned to allow the dilution gas present in the annular interspace or cavity 10, such as for example the compressed air arriving from compressor 102, to freely enter into the inner tubular member 8 and therein mix with the hot gasses flowing inside the same tubular member 8.

Preferably these effusion and/or dilution openings are moreover evenly angularly staggered about longitudinal axis B of combustor device 1. In addition, each effusion and/or dilution opening is preferably substantially circular in shape.

Optionally, inner tubular member 8 may also include a number of tubular extensions (not shown) that inwardly protrude from the second tubular portion of tubular member 8, and are each dimensioned to allow the dilution gas present in the annular interspace or cavity 10, such as for example the compressed air arriving from compressor 102, to freely enter into the inner tubular member 8 and therein mix with the hot gasses flowing inside the same tubular member 8.

Preferably these tubular extensions are moreover evenly angularly staggered about the longitudinal axis B of combustor device 1. Each tubular extension furthermore preferably protrudes in cantilever manner from the second tubular portion of tubular member 8 and preferably extends roughly radially towards the longitudinal axis B of combustor device 1.

With particular reference to FIGS. 3 and 4, outer tubular housing 9, in turn, is preferably roughly cylindrical in shape, and preferably surrounds the inner tubular member 8 substantially for the whole length of same tubular member 8. Moreover tubular housing 9 preferably has a roughly funnel-shaped end section surrounding the outer mouth of inner tubular member 8.

Preferably tubular housing 9 is furthermore provided with at least one and preferably a number/plurality of large pass-through openings or passages (not shown) that are preferably evenly angularly staggered about the longitudinal axis B of combustor device 1, and are each dimensioned to allow the free entrance of the dilution gas, such as for example the compressed air arriving from compressor 102, into the annular interspace or cavity 10.

With reference to FIGS. 3 and 4, in the example shown, in particular, the outer tubular housing 9 preferably basically comprises: a succession of preferably roughly cylindrical, discrete tubular members 12 arranged roughly coaxial to the longitudinal axis B of combustor device 1 and rigidly coupled to one another; and preferably also a funnel-shaped tubular member 13 rigidly coupled to the last tubular member 12 so as to extend roughly coaxial to the longitudinal axis B of combustor device 1 preferably slightly beyond the outlet mouth of tubular member 8, for surrounding the same outlet mouth of tubular member 8.

With particular reference to FIGS. 3 and 4, the intermediate annular supporting structure 11 in turn comprises: an outer annular supporting member 20 which is stably rigidly fixed to or is directly incorporated into the outer tubular housing 9 roughly coaxial to the same tubular housing 9, i.e. roughly coaxial to the longitudinal axis B of combustor device 1; an inner annular supporting member 21 which is stably rigidly fitted to or directly incorporated into the inner tubular member 8 roughly coaxial to the same tubular member 8, i.e. roughly coaxial to the longitudinal axis B of combustor device 1; and a series of three or more transversal oblong connecting beams 22 which jut out from outer annular supporting member 20 angularly staggered about the longitudinal axis B of combustor device 1, and separately extend in cantilever manner towards the inner annular supporting member 21 in a transversal non-radial direction w to separately stably connect the two annular supporting members 20 and 21 to one another.

In more detail, these oblong connecting beams 22 preferably rigidly protrude from the outer annular supporting member 20 angularly staggered about the longitudinal axis B of combustor device 1, and separately extend in cantilever manner and in said non-radial direction w towards the inner annular supporting member 21. The distal ends of the oblong connecting beams 22 are furthermore stably connected to inner annular supporting member 21 at respective fixing points angularly staggered about the longitudinal axis B of combustor device 1.

In other words, the inner annular supporting member 21 is axially misaligned, i.e. axially shifted, with respect to the outer annular supporting member 20, and the oblong connecting beams 22 form a roughly funnel-shaped annular framework that stably connects the outer annular supporting member 20 to inner annular supporting member 21.

Preferably the oblong connecting beams 22 are moreover roughly evenly angularly staggered about the longitudinal axis B of combustor device 1, and each connecting beam 22 preferably extends from outer annular supporting member 20 to inner annular supporting member 21 while remaining coplanar to a corresponding radially-extending reference laying plane.

In other words, the fixing points of the oblong connecting beams 22 on the inner annular supporting member 21 are angularly aligned to the starting points or roots of the oblong connecting beams 22 on the outer annular supporting member 20.

In addition to the above, each oblong connecting beam 22 is moreover structured to have a flexible behavior in radial direction, so that the distal end of the same beam is allowed to freely make small movements in a direction d locally perpendicular to the annular supporting member 21, i.e. to freely make small movements in a radial direction d.

In other words, the oblong connecting beams 22 are flexible in radial direction and rigid in axial direction.

Preferably the distal end of each connecting beam 22 is furthermore stably fixed to the inner annular supporting member 21 via a corresponding connecting hinge 23.

In more detail, with reference to FIGS. 3 and 4, the inner annular supporting member 21 is preferably provided with a number of protruding lugs 24 that jut out from the same annular supporting member 21 angularly staggered about the longitudinal axis B of combustor device 1, and separately extend outwards in roughly radial direction so as to reach each the distal end of a respective oblong connecting beam 22.

The distal end of each oblong connecting beam 22, in turn, is firmly fixed to a respective protruding lug 24 of annular supporting member 21.

In the example shown, in particular, the distal end of each connecting beam 22 is preferably stably fixed to the corresponding lug 24 via a transversal connecting pin 25 which extends locally perpendicular to the longitudinal axis B of combustor device 1 and engages in pass-through and axially rotatable manner both the lug 24 and the distal end of the oblong connecting beam 22 so as to form a hinge assembly.

In an alternative embodiment the transversal connecting pin 25 may be replaced by a transversal bolt.

With reference to FIGS. 3 and 4, in the example shown, in particular, the annular supporting member 20 is preferably rigidly clamped in between the axial ends of two adjacent tubular members 12 of tubular housing 9. The annular supporting member 21, in turn, is preferably an integral part of inner tubular member 8.

In the example shown, moreover the annular supporting structure 11 of tubular casing 2 preferably comprises: four radially-flexible oblong connecting beams 22 preferably roughly evenly angularly staggered about the longitudinal axis B of combustor device 1, i.e. angularly spaced to one another by 90°; and four outwardly-protruding lugs 24 preferably roughly evenly angularly staggered about the longitudinal axis B of combustor device 1, i.e. angularly spaced to one another by 90°, and each angularly aligned to a respective oblong connecting beam 22.

Each oblong connecting beam 22, in turn, is preferably substantially L-shaped so that a proximal segment of the beam extends inwards from the annular supporting member 20 in a roughly radial direction, and an adjoined distal segment of the beam extends towards the corresponding lug in a non-radial direction w preferably sloped with respect to the longitudinal axis B of combustor device 1 by a rake angle α preferably ranging between 0° to 45°.

In more detail, in the example shown each connecting beam 22 preferably consists in an oblong platelike tongue which is substantially L-bent and is preferably realized in one piece with the annular supporting member 20.

General operation of combustor device 1 is similar to that of a traditional combustor device for gas turbine engines with sequential combustion.

As regards the annular supporting structure 11, the radial flexibility of the oblong connecting beams 22 allows the inner tubular member 8 to freely radially and/or axially expand, while always keeping the inner tubular member 8 coaxial to the outer tubular housing 9.

The advantages resulting from the annular supporting structure 11 are large in number.

First of all, the radially-flexible oblong connecting beams 22 are not subjected to wear problems.

Moreover the use of the three or more radially-flexible oblong connecting beams 22 angularly staggered about the longitudinal axis B of combustor device 1, allows to increase the distance between the inner tubular member 8 and the outer tubular housing 9, with all advantages in cooling that this entails.

Furthermore assembly of combustor device 1 is greatly simplified with relevant cost savings. The distal ends of the oblong connecting beams 22, in fact, are easily accessible from the outlet mouth of tubular housing 9, thus allowing a quick insertion of the connecting pins 25.

Clearly, changes may be made to the combustor device 1 and to the gas turbine engine 100 disclosed above without, however, departing from the scope of the present invention.

For example, the gas turbine engine 100 may lack the intermediate expansion turbine 105.

As regards the combustor device 1, in an alternative embodiment the lugs 24 may protrude inwards from the outer annular supporting member 20, whereas the radially-flexible oblong transversal connecting beams 22 may protrude outwards from the inner annular supporting member 21.

Moreover the inner or outer annular supporting member 20, 21 may have, preferably for each oblong transversal connecting beam 22, a pair of adjacent protruding lugs 24 forming a fork member suited to receive the distal end of the connecting beam 22.

Furthermore, rather than via a transversal connecting pin 25 or bolt, each lug 24 may be stably rigidly connected to the distal end of the corresponding radially-flexible oblong transversal connecting beam 22 by means of a welding or brazing.

Finally, according to an alternative embodiment of the annular supporting structure 11, the annular supporting members 20 and 21 are substantially coplanar to one another and the oblong connecting beams 22 extend from annular supporting member 20 to annular supporting member 21 in a non-radial direction while remaining roughly coplanar to the annular supporting members 20 and 21.

In other words the fixing points of the oblong connecting beams 22 on the inner annular supporting member 21, i.e. the lugs 24, are angularly misaligned, i.e. angularly shifted, with respect to the starting points of the oblong connecting beams 22 on the outer annular supporting member 20.

Also in this alternative embodiment, each oblong connecting beam 22 preferably rigidly protrudes inwards from the outer annular supporting member 20 and extends in cantilever manner and in a non-radial direction up to reach the inner annular supporting member 21.

Each oblong connecting beam 22 is moreover structured to have a flexible behavior in radial direction, so that the distal end of the beam is allowed to freely make small movements in a radial direction.

Figure 5:
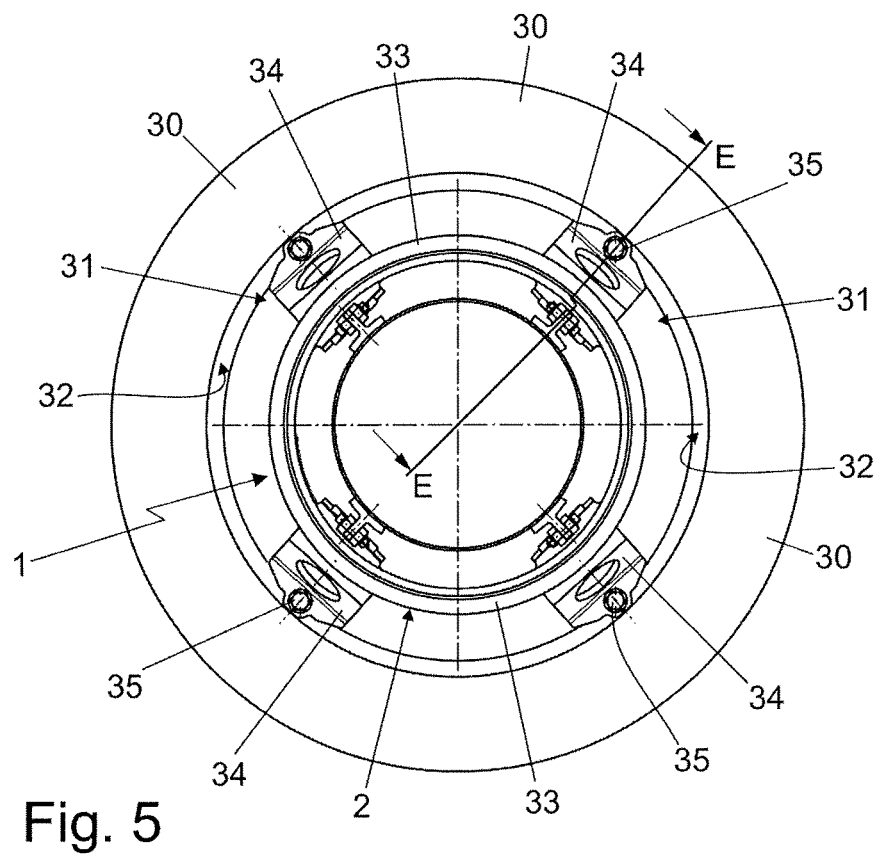
Figure 6:
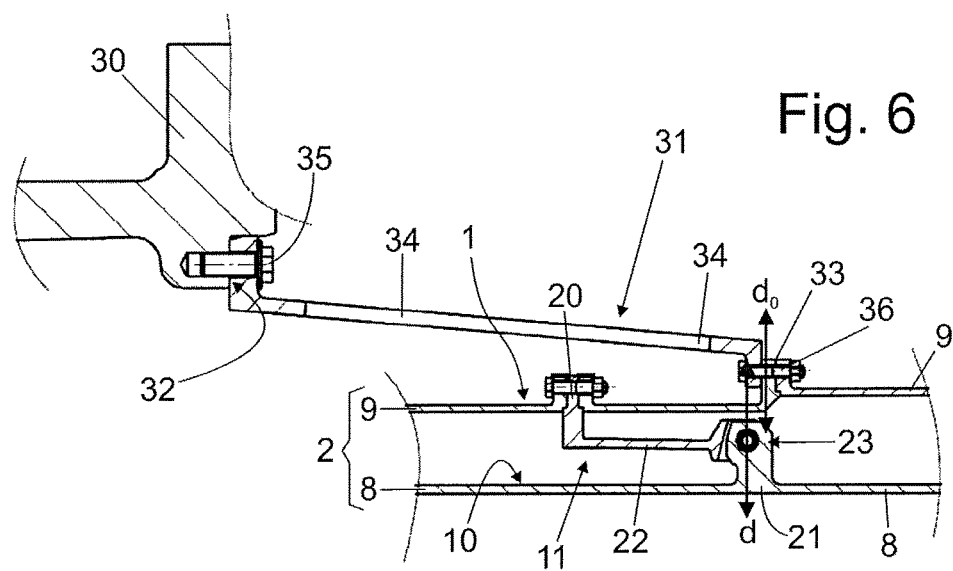
FIG. 6 is a sectioned side view along section line E-E of the combustor device shown in FIG. 5, with parts removed for clarity.

In addition to the above, with particular reference to FIGS. 5 and 6, according to an alternative embodiment, the/each oblong combustor device 1 is at least partially accommodated into a preferably roughly cylindrical, further outer tubular casing 30 which is preferably rigidly fixed to the main outer casing 101 of gas turbine engine 100, and is dimensioned to enclose the combustor device 1 while remaining slightly spaced from the latter so as to form an annular interspace or cavity. The oblong combustor device 1 is preferably firmly connected to said outer tubular casing 30 and stably maintained roughly coaxial to the longitudinal axis of the same outer tubular casing 30 by a further intermediate annular supporting structure 31 which is interposed between the tubular casing 2 of combustor device 1 and said outer tubular casing 30.

Likewise annular supporting structure 11, also annular supporting structure 30 preferably comprises: an outer annular supporting member 32 which is stably rigidly fixed to or is directly incorporated into the outer tubular casing 30 roughly coaxial to the same outer tubular casing 30, i.e. roughly coaxial to the longitudinal axis B of combustor device 1; an inner annular supporting member 33 which is stably rigidly fixed to or is directly incorporated into the tubular casing 2 of combustor device 1 roughly coaxial to the same tubular casing 2, i.e. roughly coaxial to the longitudinal axis B of combustor device 1; and a series of three or more radially-flexible transversal oblong connecting beams 34 which jut out from the outer annular supporting member 32 angularly staggered about the longitudinal axis B of combustor device 1, and separately extend in cantilever manner towards the inner annular supporting member 33 in a transversal non-radial direction to separately stably connect the two annular supporting members 32 and 33 to one another.

In the example shown, in particular, the outer annular supporting member 32 preferably consists in an annular shoulder that inwardly protrudes from the additional outer tubular casing 30, preferably at the rim of the same casing 30 and preferably in radial direction.

The inner annular supporting member 33, in turn, preferably consists in an annular flange that radially protrudes outwards from tubular housing 9.

The proximal end of each oblong connecting beam 34 is preferably rigidly and stably fixed to the annular shoulder 32 of outer tubular casing 30 preferably by means of one or more anchoring bolts 35. Obviously the anchoring bolt/s 35 may be replaced by welding/s or brazing/s.

The distal end of each oblong connecting beam 34, in turn, is preferably rigidly and stably fixed to the outwards-protruding annular flange 33 of tubular housing 9 preferably by means of one or more anchoring bolts 36. Also in this case the anchoring bolt/s 36 may be replaced by welding/s or brazing/s.

Preferably the oblong connecting beams 34 are moreover evenly angularly staggered about the longitudinal axis B of combustor device 1.

Likewise the oblong connecting beams 22 of supporting structure 11, each oblong connecting beam 34 is moreover structured to have a flexible behavior in radial direction, so that the distal end of the same beam 34 is allowed to freely make small movements in a radial direction $d_0$.

In other words, likewise the oblong connecting beams 22, the oblong connecting beams 34 are flexible in radial direction and rigid in axial direction.

The invention claimed is:

1. A combustor device for a gas turbines engine, the combustor device comprising:
 a tubular casing which delimits an oblong combustion chamber wherein combustion of an inflammable mixture is to occur; and
 a burner located inside the tubular casing, upstream of said oblong combustion chamber, and forming said inflammable mixture;
 said tubular casing having an inner tubular member which extends coaxial a longitudinal axis of the combustor device, delimits the oblong combustion chamber and surrounds the burner; and having an outer tubular housing which extends coaxial to the inner tubular member, outside of the inner tubular member, and being dimensioned to enclose the inner tubular member and spaced apart from the inner tubular member; and an intermediate supporting structure interposed between the inner tubular member and the outer tubular housing for firmly connecting and stably maintaining the inner tubular member coaxial to the outer tubular housing, wherein said intermediate supporting structure includes:
an outer annular supporting member associated to the outer tubular housing;
an inner annular supporting member associated to the inner tubular member; and
a series of three or more oblong connecting beams which jut out angularly staggered about the longitudinal axis of the combustor device from a first annular supporting member among said inner and outer annular supporting members, and separately extend to the other annular supporting member among said inner and outer annular supporting members in a direction having a non-radial component to stably connect said inner and outer annular supporting members to one another, wherein the outer annular supporting member is clamped between axial ends of two adjacent tubular members of the outer tubular housing, wherein each of the oblong connecting beams rigidly protrudes from said first annular supporting member, and separately extends in said direction having the non-radial component towards said other annular supporting member, distal ends of said oblong connecting beams being stably connected to said other annular supporting member, wherein the distal end of each of the oblong connecting beams is hinged to said inner annular supporting member.

2. The combustor device according to claim 1, wherein said inner annular supporting member comprises:
a number of protruding lugs that jut out angularly staggered about the longitudinal axis of the combustor device from the inner annular supporting member, the distal end of each of the oblong connecting beams being stably connected to a respective one of the protruding lugs of said inner annular supporting member.

3. The combustor device according to claim 1, wherein the distal ends of the oblong connecting beams are stably connected to said inner annular supporting member at respective fixing points angularly staggered about the longitudinal axis of the combustor device.

4. The combustor device according to claim 3, wherein the respective fixing points of said oblong connecting beams onto said inner annular supporting member are axially and/or angularly misaligned to fixing points of respective oblong connecting beams onto said outer annular supporting member.

5. The combustor device according to claim 1, wherein said oblong connecting beams are evenly angularly staggered about the longitudinal axis of the combustor device.

6. The combustor device according to claim 1, wherein said inner and said outer annular supporting members are axially shifted to one another.

7. The combustor device according to claim 6, wherein each of the oblong connecting beams is arranged coplanar to a radially-extending reference laying plane.

8. The combustor device according to claim 1, wherein each of the oblong connecting beams is substantially L-shaped so that a proximal segment of each of the oblong connecting beams extends from said outer annular supporting member in a radial direction, and an adjoined distal segment of each of the oblong connecting beams extends towards the inner annular supporting member in the direction having the non-radial component sloped with respect to the longitudinal axis of combustor device.

9. The combustor device according to claim 1, wherein said inner annular supporting member is stably rigidly fitted to or is directly incorporated into said inner tubular member.

10. The combustor device according to claim 1, wherein said outer annular supporting member is stably rigidly fixed to or is directly incorporated into said outer tubular housing.

11. A combustor device in combination with a gas turbine engine comprising:
a compressor for compression of outside air for producing a flow of compressed air;
a combustor assembly for combustion of an inflammable mixture including a mixture of fuel and the compressed air arriving from said compressor for producing a flow of hot gasses; and an expansion turbine for expansion of the hot gasses upon arriving from the combustor assembly;
said combustor assembly having at least one of the combustor device;
the combustor device comprising:
a tubular casing which delimits an oblong combustion chamber wherein combustion of the inflammable mixture is to occur; and
a burner located inside the tubular casing, upstream of said oblong combustion chamber, and forming said inflammable mixture;
said tubular casing having an inner tubular member which extends coaxial a longitudinal axis of the combustor device, delimits the oblong combustion chamber and surrounds the burner; and having an outer tubular housing which extends coaxial to the inner tubular member, outside of the inner tubular member, and being dimensioned to enclose the inner tubular member and spaced apart from the inner tubular member; and an intermediate supporting structure interposed between the inner tubular member and the outer tubular housing for firmly connecting and stably maintaining the inner tubular member coaxial to the outer tubular housing, wherein said intermediate supporting structure includes:
an outer annular supporting member associated to the outer tubular housing;
an inner annular supporting member associated to the inner tubular member; and
a series of three or more oblong connecting beams which jut out angularly staggered about the longitudinal axis of the combustor device from a first annular supporting member among said inner and outer annular supporting members, and separately extend to the other annular supporting member among said inner and outer annular supporting members in a direction having a non-radial component to stably connect said inner and outer annular supporting members to one another, wherein the outer annular supporting member is clamped between axial ends of two adjacent tubular members of the outer tubular housing, wherein each of the oblong connecting beams rigidly protrudes from said first annular supporting member, and separately extends in said direction having the non-radial component towards said other annular supporting member, distal ends of said oblong connecting beams being stably connected to said other annular supporting member, wherein the distal end of each of the oblong connecting beams is hinged to said inner annular supporting member.

12. A gas turbine engine comprising:
a compressor for compression of outside air for producing a flow of compressed air;

a combustor assembly for combustion of a mixture of fuel and the compressed air arriving from said compressor for producing a flow of hot gasses; and an expansion turbine for expansion of the hot gasses upon arriving from the combustor assembly;

the combustor assembly comprising a tubular casing which delimits an oblong combustion chamber wherein the combustion of the mixture of the fuel and the compressed air is to occur; the tubular casing comprising an inner tubular element;

an outer tubular element extending coaxial to said inner tubular element, outside of the inner tubular element, and being dimensioned to enclose the inner tubular element and spaced apart from the inner tubular element; and an intermediate supporting structure which is interposed between the inner tubular element and the outer tubular element for firmly connecting and stably maintaining the inner tubular element coaxial to the outer tubular element; said intermediate supporting structure having:

an outer annular supporting member associated to the outer tubular element;

an inner annular supporting member associated to the inner tubular element; and a series of three or more oblong connecting beams which jut out angularly staggered about a longitudinal axis of the inner annular supporting member from a first annular supporting element among said inner and outer annular supporting members, and separately extend to the other annular supporting member among said inner and outer annular supporting members in a direction having a non-radial component to stably connect said inner and outer annular supporting members to one another, wherein the outer annular supporting member is clamped between axial ends of two adjacent tubular members of the outer tubular element, wherein each of the oblong connecting beams rigidly protrudes from said first annular supporting member, and separately extends in said direction having the non-radial component towards said other annular supporting member, distal ends of said oblong connecting beams being stably connected to said other annular supporting member, wherein the distal end of each of the oblong connecting beams is hinged to said inner annular supporting member.

* * * * *